US006319967B1

(12) United States Patent
Coca et al.

(10) Patent No.: US 6,319,967 B1
(45) Date of Patent: Nov. 20, 2001

(54) THERMOSETTING COMPOSITIONS CONTAINING EPOXY-FUNCTIONAL POLYMERS PREPARED USING ATOM TRANSFER RADICAL POLYMERIZATION

(75) Inventors: Simion Coca, Pittsburgh; Dennis A. Simpson, Wexford; James B. O'Dwyer, Valencia; Kurt G. Olson, Gibsonia, all of PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/375,021

(22) Filed: Aug. 16, 1999

Related U.S. Application Data

(60) Provisional application No. 60/098,622, filed on Aug. 31, 1998.

(51) Int. Cl.[7] .......................... C08G 59/32; C08L 53/00; C08L 63/00

(52) U.S. Cl. ......................... 523/436; 525/94; 525/327.3; 525/386

(58) Field of Search .................................. 525/94, 327.3, 525/386; 523/436

(56) References Cited

U.S. PATENT DOCUMENTS

| | | | |
|---|---|---|---|
| 3,752,870 * | 8/1973 | Labana | 523/437 |
| 3,876,587 * | 4/1975 | Matsui et al. | 525/327.3 |
| 4,147,679 | 4/1979 | Scriven et al. | 260/29.2 TN |
| 4,388,448 | 6/1983 | Melby | 525/327.3 |
| 4,403,003 | 9/1983 | Backhouse | 427/407.1 |
| 4,940,761 * | 7/1990 | Spinelli et al. | 525/327.3 |
| 4,975,474 * | 12/1990 | Barsotti et al. | 525/94 |
| 5,071,904 | 12/1991 | Martin et al. | 524/458 |
| 5,384,367 | 1/1995 | Swarup et al. | 525/169 |
| 5,763,548 | 6/1998 | Matyjaszewski et al. | 526/135 |
| 5,789,487 | 8/1998 | Matyjaszewski et al. | 525/301 |
| 5,807,937 | 9/1998 | Matyjaszewski et al. | 526/135 |
| 5,854,364 * | 12/1998 | Senniger et al. | 526/192 |
| 5,945,487 | 8/1999 | Ohkoshi et al. . | |

FOREIGN PATENT DOCUMENTS

| | | |
|---|---|---|
| 0 248 596 A2 | 12/1987 | (EP) . |
| 96/30421 | 10/1996 | (WO) . |
| 97/18247 | 5/1997 | (WO) . |
| 98/01480 | 1/1998 | (WO) . |
| 98/40415 | 9/1998 | (WO) . |

OTHER PUBLICATIONS

ASTM—Designation: D 1474–98; pp. 1–5; Standard Test Methods for Indentation Hardness of Organic Coatings.

ASTM—Designation: D 1639–90; pp. 260–261; Standard Test Method for Acid Value of Organic Coating Materials.

ASTM—Designation: D 1652–97; pp. 1–4; Standard Test Methods for Expoxy Content of Epoxy Resins.

ASTM—Designation: D 2369–87; pp. 321–323; Standard Test Method for Volatile Content of Coatings.

Matyjaszewski, K. et al., "Polymerization of Acrylates by Atom Transfer Radical Polymerization. Homopolymerization of Glycidyl Acrylate," *Macromol. Chem., Phys.,* 198, 4011–4017, (1997).

Coca, S. et al., "Polymerization of Acrylates by Atom Transfer Radical Polymerization. 1. Homopolymerization of 2–Hydroxyethyl–, Glycidyl–, Vinyl– and Allyl Acrylate," *Polymer Preprints*, vol. 38, No. 1, pp. 690–692, (1997).

* cited by examiner

*Primary Examiner*—Donald R. Wilson
(74) *Attorney, Agent, or Firm*—William J. Uhl; James R. Franks

(57) ABSTRACT

A thermosetting composition is provided comprising:

(a) a crosslinking agent having at least two functional groups that are reactive with epoxides; and (b) a non-gelled, epoxy functional polymer prepared by atom transfer radical polymerization, in the presence of an initiator having at least one radically transferable group. The polymer contains at least one of the following polymer chain structures:

$$—\{(M)_p—(G)_q\}_x—\text{or}$$

$$—\{(G)_q—(M)_p\}_x—$$

wherein M is a residue, that is free of epoxy functionality, of at least one ethylenically unsaturated radically polymerizable monomer; G is a residue, that has epoxy functionality, of at least one ethylenically unsaturated radically polymerizable monomer; p and q represent average numbers of residues occurring in a block of residues in each polymer chain structure; and p, q, and x are each independently selected for each structure such that the epoxy functional polymer has a number average molecular weight of at least 250. Also provided by the present invention are methods of coating a substrate using compositions of the present invention and substrates coated by such methods, as well as color-plus-clear composite coatings.

25 Claims, No Drawings

THERMOSETTING COMPOSITIONS CONTAINING EPOXY-FUNCTIONAL POLYMERS PREPARED USING ATOM TRANSFER RADICAL POLYMERIZATION

CROSS-REFERENCE TO RELATED APPLICATION

This application claims the benefit of U.S. Provisional Application Ser. No. 60/098622, filed Aug. 31, 1998, which is hereby incorporated by reference.

FIELD OF THE INVENTION

The present invention relates to thermosetting (curable) compositions of one or more crosslinking agents and one or more epoxy functional polymers. The epoxy functional polymer is prepared by atom transfer radical polymerization, and has well defined polymer chain structure, molecular weight and molecular weight distribution. The present invention also relates to methods of coating a substrate, substrates coated by such methods, and color-plus-clear composite coating compositions.

BACKGROUND OF THE INVENTION

Reducing the environmental impact of curable compositions, such as that associated with emissions into the air of volatile organic compounds during the application of curable coating compositions, has been an area of ongoing investigation and development in recent years. Accordingly, interest in high solids liquid coating Compositions has been increasing, due in part to their comparatively lower volatile organic content (VOC), which significantly reduces air emissions during the application process.

Lower VOC coating compositions are particularly desirable in the automotive original equipment manufacture (OEM) market, due to the relatively large volume of coatings that are used. However, in addition to the requirement of lower VOC levels, automotive manufacturers have very strict performance requirements for the coatings that are used. For example, automotive OEM clear top coats are typically required to have a combination of good exterior durability acid etch and water spot resistance, and excellent gloss and appearance.

Thermosetting coatings containing epoxy functional polymers have been developed in recent years for use as automotive OEM clear top coats. Such coating compositions typically comprise a crosslinking agent having at least two functional groups that are reactive with epoxides, and an epoxy functional polymer. The epoxy functional polymers used in such coating compositions are typically prepared by standard, i.e., non-living, radical polymerization methods, which provide little control over molecular weight, molecular weight distribution and polymer chain structure.

The physical properties, e.g., viscosity, of a given polymer can be directly related to its molecular weight. Higher molecular weights are typically associated with, for example, higher Tg values and viscosities. The physical properties of a polymer having a broad molecular weight distribution, e.g., having a polydispersity index (PDI) in excess of 2.5, can be characterized as an average of the individual physical properties of and indeterminate interactions between the various polymeric species that comprise it. As such, the physical properties of polymers having broad molecular weight distributions can be variable and hard to control.

The polymer chain structure, or architecture, of a polymer can be described as the sequence of monomer residues along the polymer back bone or chain. An epoxy functional copolymer prepared by standard radical polymerization techniques will contain a mixture of polymer molecules having varying individual epoxy equivalent weights and polymer chain structures. In such a copolymer, the epoxy functional groups are located randomly along the polymer chain. Moreover, the number of functional groups is not divided equally among the polymer molecules, such that some polymer molecules may actually be free of epoxy functionality. In a thermosetting composition, the formation of a three-dimensional crosslinked network is dependent on the functional equivalent weight as well as the architecture of the individual polymer molecules that comprise it. Polymer molecules having little or no reactive functionality (or having functional groups that are unlikely to participate in crosslinking reactions due to their locations along the polymer chain) will contribute little or nothing to the formation of the three-dimensional crosslinked network, resulting in decreased crosslink density and less than optimum physical properties of the finally formed polymerizate, e.g., a cured or thermoset coating.

The continued development of new and improved thermosetting compositions having lower VOC levels and a combination of favorable performance properties is desirable. In particular, it would be desirable to develop thermosetting compositions that comprise epoxy functional copolymers having well-defined molecular weights and polymer chain structure, and narrow molecular weight distributions, e.g., PDI values less than 2.5.

International patent publication wo 97/18247 and U.S. Pat. Nos. 5,763,548 and 5,789,487 describe a radical polymerization process referred to as atom transfer radical polymerizAtion (ATRP). The ATRP process is described as a living radical polymerization that results in the formation Of polymers having predictable molecular weight and molecular weight distribution. The ATRP process of these publications is also described as providing highly uniform products having controlled structure (i.e., controllable topology, composition, etc.). These patent publications also describe polymers prepared by ATRP, which are useful in a wide variety of applications, for example, with paints and coatings.

It would be desirable to develop thermosetting compositions that comprise epoxy functional copolymers prepared using atom tran5fer radical polymerization, thus having well-defined molecular weights and polymer chain structure, and narrow molecular weight distributions. Such compositions would have lower VOC levels due to lower viscosities, and a combination of favorable performance properties, particularly in coatings applications.

SUMMARY OF THE INVENTION

In accordance with the present invention, a thermosetting composition is provided comprising:

(a) a crosslinking agent having at least two functional groups that are reactive with epoxidogi and (b) a non-gelled, epoxy functional polymer prepared by atom transfer radical polymerization, in the presence of an initiator having at least one radically transferable group, and wherein the polymer contains at least one of the following polymer chain structures:

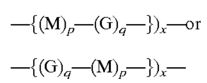

$$-\{(M)_p-(G)_q-\}_x- \text{ or}$$

$$-\{(G)_q-(M)_p-\}_x-$$

wherein M is a residue, that is free of epoxy functionality, of at least one ethylenically unsaturated radically polymerizable monomer; G is a residue, that has epoxy functionality, of at least one ethylenically unsaturated radically polymerizable monomer; p and q represent average numbers of residues occurring in a block of residues in each polymer chain structure; and p, q, and x are each independently selected for each structure such that the epoxy functional polymer has a number average molecular weight of at least 250.

Also provided by the present invention are methods of coating a substrate using compositions of the present invention, substrates coated by such methods, and color-plus-clear composite coating compositions.

Other than in the operating examples, or where otherwise indicated, all numbers expressing quantities of ingredients, reaction conditions, and so forth used in the specification and claims are to be understood as modified in all instances by the term "about".

DETAILED DESCRIPTION

As used herein, the term "polymer" is meant to refer to both homopolymers, i.e., polymers made from a single monomer species, and copolymers, i.e., polymers made from two or more monomer species, as well as oligomers.

The epoxy functional polymer used in the composition of the present invention is a non-gelled polymer prepared by atom transfer radical polymerization, in the presence of an initiator having at least one radically transferable group. The polymer contains at least one of the following polymer chain structures:

$$-\{(M)_p-(G)_q-\}_x-\text{or} \quad (I)$$

$$-\{(G)_q-(M)_p-\}_x- \quad (II)$$

where M is a residue, that is free of epoxy functionality, of at least one ethylenically unsaturated radically polymerizable monomer; G is a residue, that has epoxy functionality, of at least one ethylenically unsaturated radically polymerizable monomer; p and q represent average numbers of residues occurring in a block of residues in each polymer chain structure; and p, q, and x are each independently selected for each structure such that the epoxy functional polymer has a number average molecular weight ($M_n$) of at least 250, preferably at least 1000, and more preferably at least 2000. The epoxy functional polymer also typically has a $M_n$ of less than 16,000, preferably less than 10,000, and more preferably less than 5000. The $M_n$ of the epoxy functional polymer may range between any combination of these values, inclusive of the recited values. Unless otherwise indicated, all molecular weights described in the specification and claims are determined by gel permeation chromatography using a polystyrene standard. Note that structures I and II define "x segments" within the polymer.

The subscripts p and q as shown in structures I and II represent average numbers of residues occurring in a block of residues in each polymer chain structure. Typically, p and q each independently have a value of 0 or more, preferably at least 1, and more preferably at least 5 for each of general polymer structures I and II. Also, subscripts p and q each independently have a value of typically less than 100, preferably less than 20, and more preferably less than 15 for each of general polymer structures I and II. The values of subscripts p and q may range between any combination of these values, inclusive of the recited values. Moreover, the sum of p and q is greater than zero within an x segment and q is greater than zero within at least one x segment in the polymer.

Typically, the subscript x as shown in structures I and II has a value of at least 1. Also, subscript x typically has a value of less than 100, preferably less than 50, and more preferably less than 10. The value of subscript x may range between any combination of these values, inclusive of the recited values. Moreover, when more than one of the structures I and/or II occur in a polymer molecule, x may have different values for each structure (as may p and q) allowing for a variety of polymer architectures, such as gradient copolymers.

The $-(M)_p-$ portion of general structures I and II represents (1) a homoblock of a single type of M residue (that is p units long), (2) an alternating block of two types of M residues, (3) a polyblock of two or more types of M residues, or (4) a gradient block of two or more types of M residues. For purposes of illustration, when the M-block is prepared from, for example, 10 moles of methyl methacrylate, the $-(M)_p-$ portion of structures I and II represents a homoblock of 10 residues of methyl methacrylate. In the case where the M-block is prepared from, for example, 5 moles of methyl methacrylate and 5 moles of butyl methacrylate, the $-(M)_p-$ portion of general structures I and II typically represents, depending on the conditions of preparation, as is known to one of ordinary skill in the art: (a) a diblock of 5 residues of methyl methacrylate and 5 residues of butyl methacrylate having a total of 10 residues (i.e., p=10); (b) a diblock of 5 residues of butyl methacrylate and 5 residues of methyl methacrylate having a total of 10 residues; (c) an alternating block of methyl methacrylate and butyl methacrylate residues beginning with either a residue of methyl methacrylate or a residue of butyl methacrylate, and having a total of 10 residues; or (d) a gradient block of methyl methacrylate and butyl methacrylate residues beginning with either residues of methyl methacrylate or residues of butyl methacrylate having a total of 10 residues.

The $-(G)_q-$ portions of polymer chain structures I and II may be described in a manner similar to that of the $-(M)_p-$ portions.

The following are presented for the purpose of illustrating the various polymer architectures that are represented by general polymer chain structures I and II.

Homoblock polymer architecture:

When x is 1, p is 0 and q is 5, general polymer chain structure I represents a homoblock of 5 G residues, as more specifically depicted by the following general formula III.

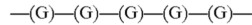

III

Diblock copolymer architecture:

When x is 1, p is 5 and q is 5, general polymer chain structure I represents a diblock of 5 M residues and 5 G residues as more specifically depicted by the following general formula IV.

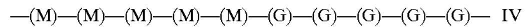

IV

Alternating copolymer architecture:

When x is greater than 1, for example, 5, and p and q are each 1 for each x-segment, polymer chain structure I represents an alternating block of M and G residues, as more specifically depicted by the following general formula V.

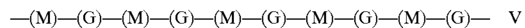

V

Gradient copolymer architecture:

When x is greater than 1, for example, 4, and p and q are each independently within the range of, for example, I to 3, for each x-segment, polymer chain structure I represents a gradient block of M and G residues, as more specifically depicted by the following general formula VI.

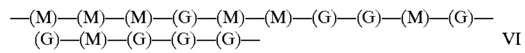

VI

Gradient copolymers can be prepared from two or more monomers by ATRP methods, and are generally described as having architecture that changes gradually and in a systematic and predictable manner along the polymer backbone. Gradient copolymers can be prepared by ATRP methods by (a) varying the ratio of monomers fed to the reaction medium during the course of the polymerization, (b) using a monomer feed containing monomers having different rates of polymerization, or (c) a combination of (a) and (b). Gradient copolymers are described in further detail on pages 72 through 78 of international patent publication WO 97/18247.

Residue M of general polymer chain structures I and II is derived from at least one ethylenically unsaturated radically polymerizable monomer. As used herein and in the claims, "ethylenically unsaturated radically polymerizable monomer" and like terms are meant to include vinyl monomers, (meth)allylic monomers, olefins and other ethylenically unsaturated monomers that are radically polymerizable.

Classes of vinyl monomers from which M may be derived include, but are not limited to, (meth)acrylates, vinyl aromatic monomers, vinyl halides and vinyl esters of carboxylic acids. As used herein and in the claims, by "(meth) acrylate" and like terms is meant both methacrylates and acrylates. Preferably, residue M is derived from at least one of alkyl (meth)acrylates having from 1 to 20 carbon atoms in the alkyl group, vinyl aromatic monomers, vinyl halides, vinyl esters of carboxylic acids and olefins. Specific examples of alkyl (meth)acrylates having from 1 to 20 carbon atoms in the alkyl group from which residue M may be derived include, but are not limited to, methyl (meth) acrylate, ethyl (meth) acrylate, 2-hydroxyethyl (meth) acrylatef propyl (meth)acrylate, 2-hydroxypropyl (meth) acrylate, isopropyl (meth)acrylate, butyl (meth)acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethyl cyclohexyl (meth)acrylate, and isobutyl (meth)acrylate.

Residue M may also be selected from monomers having more than one (meth)acrylate group, for example, (meth) acrylic anhydride and diethyleneglycol bis((meth)acrylate). Residue M may also be selected from alkyl (meth)acrylates containing radically transferable groups, which can act as branching monomers, for example, 2-(2-bromopropionoxy) ethyl acrylate.

Specific examples of vinyl aromatic monomers from which M may be derived include, but are not limited to, styrene, p-chloromethylstyrene, divinyl benzene, vinyl naphthalene and divinyl naphthalene. Vinyl halides from which M may be derived include, but are not limited to, vinyl chloride and vinylidene fluoride. Vinyl esters of carboxylic acids from which M may be derived include, but are not limited to, vinyl acetate, vinyl butyrate, vinyl benzoate, vinyl esters of VERSATIC Acid (VERSATIC Acid is a mixture of tertiary aliphatic carboxylic acids available from Shell Chemical Company), and the like.

As used herein and in the claims, by "olefin" and like terms is meant unsaturated aliphatic hydrocarbons having one or more double bonds, obtained by cracking petroleum fractions. Specific examples of olefins from which M may be derived include, but are not limited to, propylene, 1-butene, 1,3-butadiene, isobutylene and di-isobutylene.

As used herein and in the claims, by "(meth)allylic monomer(s)" is meant monomers containing substituted and/or unsubstituted allylic functionality, i.e., one or more radicals represented by the following general formula VII,

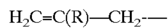

VII wherein R is hydrogen, halogen or a $C_1$ to $C_4$ alkyl group. Most commonly, R is hydrogen or a methyl group. Examples of (meth)allylic monomers include, but are not limited to: (meth)allyl alcohol; (meth)allyl ethers, such as methyl (meth)allyl ether; (meth)allyl esters of carboxylic acids, such as (meth)allyl acetate; (meth)allyl benzoate; (meth)allyl n-butyrate; (meth)allyl esters of VERSATIC Acid; and the like.

Other ethylenically unsaturated radically polymori2able monomers from which M may be derived include, but are not limited to: cyclic anhydrides, e.g., maleic anhydride, 1-cyclopentene-1,2-dicarboxylic anhydride and itaconic anhydride; esters of acids that are unsaturated but do not have α, β-ethylenic unsaturation, e.g., methyl ester of undecylenic acid; and diesters of ethylenically unsaturated dibasic acids, e.g., diethyl maleate.

The monomer block designated as $(G)_q$ in the structures above may be derived from one type of monomer or a mixture of two or more monomers. As discussed above, such mixtures may be blocks of monomer residues or they may be alternating residues.

Residue G of general polymer chain structures I and II may be derived from monomers having epoxy functionality. Preferably residue G is derived from at least one of glycidyl (meth)acrylate, 3,4-epoxycyclohexylmethyl(meth)acrylate, 2-(3,4-epoxycyclohexyl)ethyl(meth)acrylate and allyl glycidyl ether. In a particularly preferred embodiment of the present invention, residue G is derived from glycidyl methacrylate. Alternatively, epoxy functionality may be incorporated into the polymer by post-reaction, such as by preparing a hydroxyl or acid functional polymer and converting it to an epoxy functional polymer by reacting it with epichlorohydrin or a glycidyl ester.

Preferably, the polymer contains at least one of the following polymer chain structures:

$$\phi\text{—}[\{(M)_p\text{—}(G)_q\}_x\text{—}(M)_r\text{—}T]_z \qquad \text{(VIII)}$$

or $$\phi\text{—}[\{(G)_q\text{—}(M)_p\}_x\text{—}(G)_s\text{—}T]_z \qquad \text{(IX)}$$

where the subscripts r and s represent average numbers of residues occurring in the respective blocks of M and G residues. The —$(M)_r$— and —$(G)_s$— portions of general structures VIII and IX have meanings similar to those as previously described herein with regard to portions —$(M)_p$— and —$(G)_q$—. The moiety φ is or is derived from a residue of the initiator free of the radically transferable group; p, q, and x are as defined above; z is at least 1; T is or is derived from the radically transferable group of the initiator; and the epoxy functional polymer has a polydispersity index of less than 2.5, preferably less than 2.0, more preferably less than 1.8 and even more preferably less than 1.5.

It should be understood that the structures VIII and IX can represent the polymer itself or, alternatively, each of the structures can comprise a terminal segment of the polymer. For example, when the polymer is by prepared by ATRP using an initiator having one radically transferable group and z is 1, either of the structures VIII and IX can represent an entire linear polymer. However, when the epoxy functional polymer is a star or other branched polymer, wherein some of the branches may not have epoxy functionality, general polymer chain structures VIII and IX represent a portion of the epoxy functional polymer.

For each of general polymer structures VIII and IX, the subscripts r and s each independently have a value of 0 or more. Subscripts r and s each independently have a value of typically less than 100, preferably less than 50, and more preferably less than 10, for each of general polymer structures VIII and IX. The values of r and s may each range between any combination of these values, inclusive of the recited values.

The epoxy functional polymer typically has an epoxy equivalent weight of at least 128 grams/equivalent, preferably at least 200 grams/equivalent. The epoxy equivalent weight of the polymer is also preferably less than 10,000 grams/equivalent, preferably less than 5000 grams/equivalent, and more preferably less than 1000 grams/equivalent. The epoxy equivalent weight of the epoxy functional polymer may range between any combination of these values, inclusive of the recited values. As used herein, epoxy functional equivalent weights are determined in accordance with ASTM D 1652.

As mentioned above, the epoxy functional polymer used in the thermosetting compositions of the present invention is prepared by atom transfer radical polymerization. The ATRP method is described as a "living polymerizatior," i.e., a chain-growth polymerization that propagates with essentially no chain transfer and essentially no chain termination. The molecular weight of a polymer prepared by ATRP can be controlled by the stoichiometry of the reactants, i.e., the initial concentration of monomer(s) and initiator(s). In addition, ATRP also provides polymers having characteristics including, for example, narrow molecular weight distributions, e.g., PDI values less than 2.5, and well defined polymer chain structure, e.g., block copolymers and alternating copolymers.

The ATRP process can be described generally as comprising: polymerizing one or more radically polymerizable monomers in the presence of an initiation system; forming a polymer; and isolating the formed polymer. The initiation system comprises: an initiator having at least one radically transferable atom or group; a transition metal compound, i.e., a catalyst, which participates in a reversible redox cycle with the initiator; and a ligand, which coordinates with the transition metal compound. The ATRP process is described in further detail in international patent publication WO 97/18247 and U.S. Pat. No. 5,763,548 and 5,789,487.

In preparing epoxy functional polymers of the present invention, the initiator may be selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds, and mixtures thereof, each having at least one radically transferable group, which is typically a halo group. The initiator may also be substituted with functional groups, e.g., epoxy groups. Additional useful initiators and the various radically transferable groups that may be associated with them are described on pages 42 through 45 of international patent publication Wo 97/18247.

Polymeric compounds (including oligomeric compounds) having radically transferable groups may be used as initiators, and are herein referred to as "macroinitiators." Examples of macroinitiators include, but are not limited to, polystyrene prepared by cationic polymerization and having a terminal halide, e.g., chloride, and a polymer of 2-(2-bromopropionoxy) ethyl acrylate and one or more alkyl (meth)acrylates, e.g., butyl acrylate, prepared by conventional non-living radical polymerization. Macroinitiators can be used in the ATRP process to prepare graft polymers, such as grafted block copolymers and comb copolymers. A further discussion of macroinitiators is found in U.S. Pat. No. 5,789,487.

Preferably, the initiator may be selected from the group consisting of halomethane, methylenedihalide, haloform, carbon tetrahalide, methanesulfonyl halide, p-toluenesulfonyl halide, methanesulfenyl halide, p-toluenesulfenyl halide, 1-phenylethyl halide, 2-halopropionitrile, $C_1$–$C_6$-alkyl ester of 2-halo-$C_1$–$C_6$-carboxylic acid, p-halomethylstyrene, mono-hexakis ($\alpha$-halo-C1-C6-alkyl)benzene, diethyl-2-halo-2-methyl malonate, benzyl halide, ethyl 2-bromoisobutyrate and mixtures thereof. A particularly preferred initiator is diethyl-2-bromo-2-methyl malonate.

Catalysts that may be used in preparing epoxy functional polymers of the present invention, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula X, $$TM^{n+}Q_n \qquad (X)$$

wherein TM is the transition metal, n is the formal charge on the transition metal having a value of from 0 to 7, and Q is a counterion or covalently bonded component. Examples of the transition metal (TM) include, but are not limited to, Cu, $Au^{2+}$, Ag, Hg, Pd, Pt, Co, Mn, Ru, Mo, Nb, Fe, and Zn. Examples of Q include, but are not limited to, halogen, hydroxy, oxygen, $C_1$–$C_6$-dlkoxy, cyano, cyanato, thiocyanato and azido. A preferred transition metal is Cu(I) and Q is preferably halogen, e.g., chloride. Accordingly, a preferred class of transition metal catalysts are the copper halides, e.g., Cu(I)CI. It is also preferred that the transition metal catalyst contain a small amount, e.g., 1 mole percent, of a redox conjugate, for example, $Cu(II)Cl_2$ when Cu(I)Cl is used. Additional catalysts useful in preparing the epoxy functional polymers of the present invention are described on pages 45 and 46 of international patent publication WO 97/18247. Redox conjugates are described on pages 27 through 33 of international patent publication WO 97/18247.

Ligands that may be used in preparing epoxy functional polymers of the present invention include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. A preferred class of ligands are the substituted bipyridines, e.g., 4,4'-dialkyl-bipyridyls. Additional ligands that may be used in preparing epoxy functional polymers of the present invention are described on pages 46 through 53 of international patent publication WO 97/18247.

In preparing the epoxy functional polymers of the present invention the amounts and relative proportions of initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the epoxy functional polymer can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5\times10^{-2}$:1.

In preparing the epoxy functional polymers of the present invention, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

Epoxy functional polymers useful in the thermosetting compositions of the present invention may be prepared in the absence of solvent, i.e., by means of a bulk polymerization process. Generally, the epoxy functional polymer is prepared in the presence of a solvent, typically water and/or an organic solvent. Classes of useful organic solvents include, but are not limited to, ethers, cyclic ethers, $C_5$–$C_{10}$ alkanes, $C_5$–$C_8$ cycloalkanes, aromatic hydrocarbon solvents, halogenated hydrocarbon solvents, amides, nitriles, sulfoxides, sulfones and mixtures thereof. Supercritical solvents, such as $CO_2$, $C_1$–$C_4$ alkanes and fluorocarbons, may also be employed. A preferred class of solvents are the aromatics, particularly preferred examples of which are xylene and SOLVESSO 100, a blend of aromatic solvents available from Exxon Chemicals America. Additional solvents are described in further detail on pages 53 through 56 of international patent publication WO 97/18247.

The epoxy functional polymer is typically prepared at a reaction temperature within the range of 25° C. to 140° C., preferably from 50° C. to 100° C., and a pressure within the range of 1 to 100 atmospheres, typically at ambient pressure. The atom transfer radical polymerization is typically completed in less than 24 hours, e.g., between 1 and 8 hours.

Prior to use in the thermosetting compositions of the present invention, the ATRP transition metal catalyst and its associated ligand are typically separated or removed from the epoxy functional polymer. This, however, is not a requirement of the invention. Removal of the ATRP catalyst is achieved using known methods, including, for example, adding a catalyst binding agent to the a mixture of the polymer, solvent and catalyst, followed by filtering. Examples of suitable catalyst binding agents include, for example, alumina, silica, clay or a combination thereof. A mixture of the polymer, solvent and ATRP catalyst may be passed through a bed of catalyst binding agent. Alternatively, the ATRP catalyst-may be oxidized in situ and retained in the epoxy functional polymer.

The epoxy functional polymer may be selected from the group consisting of linear polymers, branched polymers, hyperbranched polymers, star polymers, graft polymers and mixtures thereof. The form, or gross architecture, of the polymer can be controlled by the choice of initiator and monomers used in its preparation. Linear epoxy functional polymers may be prepared by using initiators having one or two radically transferable groups, e.g., diethyl-2-halo-2-methyl malonate and α, α'-dichloroxylene. Branched epoxy functional polymers may be prepared by using branching monomers, i.e., monomers containing radically transferable groups or more than one ethylenically unsaturated radically polymerizable group, e.g., 2-(2-bromopropionoxy)ethyl acrylate, p-chloromethylstyrene and diethyleneglycol bis (methacrylate). Hyperbranched epoxy functional polymers may be prepared by increasing the amount of branching monomer used.

Star epoxy functional polymers may be prepared using initiators having three or more radically transferable groups, e.g., hexakis(bromomethyl)benzene. AS is known to those of ordinary skill in the art, star polymers may be prepared by core-arm or arm-core methods. In the core-arm method, the star polymer i5 prepared by polymerizing monomers in the presence of the polyfunctional initiator, e.g., hexakis (bromomethyl)benzene. Polymer chains, or arms, of similar composition and architecture grow out from the initiator core, in the core-arm method.

In the arm-core method, the arms are prepared separately from the core and optionally may have different compositions, architecture, molecular weight and PDI's. The arms may have different epoxy equivalent weights, and some may be prepared without any epoxy functionality. After the preparation of the arms, they are attached to the core.

Epoxy functional polymers in the form or graft polymers may be prepared using a macroinitiator, as previously described herein. Graft, branched, hyperbranched and star polymers are described in further detail on pages 79 through 91 of international patent publication WO 97/18247.

The polydispersity index (PDI) of epoxy functional polymers useful in the present invention, is typically less than 2.5, more typically less than 2.0, and preferably less than 1.8, for example, 1.5. As used herein, and in the claims, "polydispersity index" is determined from the following equation: (the weight average molecular weight ($M_w$)/ number average molecular weight ($M_n$)) A monodisperse polymer has a PDI of 1.0.

The symbol φ as shown in structures VIII and IX is or is derived from a residue of the initiator free of the radically transferable group; it is most often a sulfonyl group or a malonate. For example, if the epoxy functional polymer is initiated by benzyl bromide, φ, or more specifically, φ-, is a residue of the structure:

(XI)

Also, φ may derived from the residue of the initiator. For example, when the polymer is initiated using epichlorohydrin, φ, or more specifically, φ-, is the 2,3-epoxy-propyl residue,

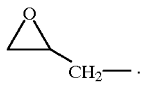

The 2,3-epoxy-propyl residue can then be converted to, for example, a 2,3-dihydroxypropyl residue. Derivations or conversions of the initiator residue are preferably performed at a point in the ATRP process when loss of epoxy functionality along the polymer backbone is minimal, for example, prior to incorporating a block of residues having epoxy functionality.

In general formulas VIII and IX, subscript z is equal to the number of epoxy functional polymer chains that are attached to φ. Subscript z is at least 1 and may have a wide range of values. In the case of comb or graft polymers, wherein φ is a macroinitiator having several pendant radically transferable groups, z can have a value in excess of 10, for example 50, 100 or 1000. Typically, z is less than 10, preferably less than 6 and more preferably less than 5. In a preferred embodiment of the present invention, z is 1 or 2.

Symbol T of general formulas VIII and IX is or is derived from the radically transferable group of the initiator. For example, when the epoxy functional polymer is prepared in the presence of diethyl-2-bromo-2-methyl malonate, T may be the radically transferable bromo group.

The radically transferable group may optionally be (a) removed or (b) chemically converted to another moiety. In either of (a) or (b), the symbol T is considered herein to be derived from the radically transferable group of the initiator. The radically transferable group may be removed by substitution with a nucleophilic compound, e.g., an alkali metal alkoxylate. In the present invention, it is desirable that the method by which the radically transferable group is either removed or chemically converted also be relatively mild with regard to the epoxy functionality of the polymer. Many nucleophilic substitutions and hydrolysis reactions can result in loss of epoxy functionality from the polymer.

In a preferred embodiment of the present invention, the radically transferable group is a halogen and is removed by means of a mild dehalogenation reaction, which does not reduce the epoxy functionality of the polymer. The reaction is typically performed as a post-reaction after the polymer has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen terminated epoxy functional polymer of the present invention with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound). As used herein, by "halogen terminated" and similar terms is meant to be inclusive also of pendent halogens, e.g., as would be present in branched, comb and star polymers.

Not intending to be bound by any theory, it is believed, based on the evidence at hand, that the reaction between the halogen terminated epoxy functional polymer and one or more LRPEU compounds results in (1) removal of the terminal halogen group, and (2) the addition of at least one carbon-carbon double bond where the terminal carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at leant a stoichiometric amount relative to the moles of terminal halogen present in the epoxy functional polymer. When added in excess of a stoichiometric amount, the LRPEU compound is typically present in an amount of no greater than 5 mole percent, e.g., 1 to 3 mole percent, in excess of the total moles of terminal halogen.

Limited radically polymerizable ethylenically unsaturated compounds useful for dehalogenating the epoxy functional polymer of the composition of the present invention under mild condition include those represented by the following general formula XII.

XII

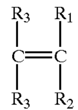

In general formula XII, $R_1$ and $R_2$ can be the same or different organic groups such as; alkyl groups having from 1 to 4 carbon atoms; aryl groups; alkoxy groups; ester groups; alkyl sulfur groups; acyloxy groups; and nitrogen-containing alkyl groups where at least one of the $R_1$ and $R_2$ groups is an organo group while the other can be an organo group or hydrogen. For instance when one of $R_1$ or $R_2$ is an alkyl group, the other can be an alkyl, aryl, acyloxy, alkoxy, arenes, sulfur-containing alkyl group, or nitrogen-containing alkyl and/or nitrogen-containing aryl groups. The $R_3$ groups can be the same or different groups selected from hydrogen or lower alkyl selected such that the reaction between the terminal halogen of the epoxy functional polymer and the LRPEU compound is not prevented. Also an $R_3$ group can be joined to the $R_1$ and/or the $R_2$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between the halogen terminated epoxy functional polymer and LRPEU compound, e.g., alpha-methyl styrene, is summarized in the following general scheme 1.

General Scheme 1

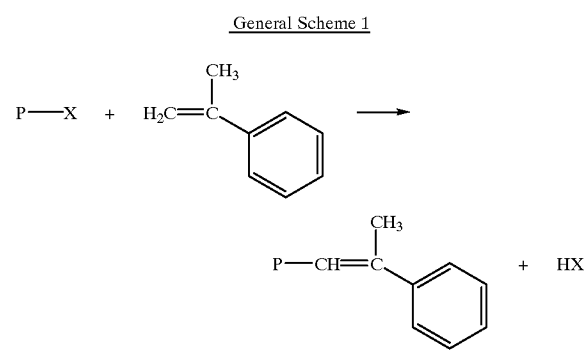

In general scheme 1, P-X represents the halogen terminated epoxy functional polymer.

As indicated above, the epoxy functional polymer may have any of a number of polymer structures, selected from linear polymers, branched polymers, hyperbranched polymers, star polymers, gradient polymers, and graft polymers. Mixtures of one or more different types of these polymers may be used in the composition of the present invention.

The epoxy functional polymer may be used in the thermosetting composition of the present invention as a resinous binder or as an additive in combination with a separate resinous binder, which may be prepared by atom transfer radical polymerization or conventional polymerization methods. When used as an additive, the epoxy functional polymer as described herein may have low functionality (it may be monofunctional) and a correspondingly high equivalent weight. Alternatively, for other applications such as use as a reactive diluent, the additive may be highly functional with a correspondingly low equivalent weight.

The epoxy functional polymer is typically present in the thermosetting composition of the present invention in an amount of at least 0.5 percent by weight (when used as an additive), preferably at least 10 percent by weight (when used as a resinous binder), and more preferably at least 25 percent by weight, based on the total weight of resin solids of the thermosetting composition. The thermosetting composition also typically contains epoxy functional polymer present in an amount of less than 99.5 percent by weight, preferably less than 90 by weight, and more preferably less than 75 percent by weight, based on the total weight of resin solids of the thermosetting composition. The epoxy functional polymer may be present in the thermosetting composition of the present invention in an amount ranging between any combination of these values, inclusive of the recited values.

The thermosetting composition of the present invention further comprises a crosslinking agent having at least two functional groups that are reactive with epoxides. The parameter of at least two functional groups per molecule is also intended to encompass mixtures of crosslinking agents in which di-functional materials are mixed with tri- or higher functionality materials. Examples of suitable crosslinking agents include polyamines, polyamides and polycarboxylic acids, including polyanhydrides, and polyphenolic compounds.

Suitable polyamines and polyamides include amine and amide functional addition polymers and oligomers typically used in film-forming compositions such as acrylic and vinyl polymers and dicyanodiamide.

Suitable polycarboxylic acids include dodecanedioic acid, azelaic acid, adipic acid, 1,6-hexanedioic acid, succinic acid, pimelic acid, sebacic acid, maleic acid, citric acid, itaconic acid, aconitic acid, carboxylic acid-terminated polyesters, half-esters formed from reacting an acid anhydride with a polyol, and mixtures thereof.

Also among the polycarboxylic acids which may be used are carboxylic acid group-containing polymers such as acrylic polymers, polyesters, and polyurethanes; oligomers such as ester group-containing oligomers; as well as fatty diacids.

Acid-functional acrylic crosslinkers may be made by copolymerizing methacrylic acid and/or acrylic acid monomers with other ethylenically unsaturated copolymerizable monomers, using techniques known to those skilled in the art. Alternatively, acid-functional acrylics can be prepared from hydroxy-functional acrylics reacted with cyclic anhydrides using conventional techniques.

Additional polycarboxylic acid crosslinking agents are ester group-containing oligomerb. Examples include half-esters formed by reacting polyols and 1,2-acid cyclic anhydrides such as the half ester formed by reacting pentaerythritol and methylhemahydrophthalic anhydride, or acid functional polyesters derived from polyols and polyacids or anhydrides. The half-esters are of relatively low molecular weight and are quite reactive with epoxy functionality enabling the formulation of high solids fluid compositions while maintaining outstanding properties such as gloss and distinctness of image.

Such ester group-containing oligomers and the preparation thereof are described in U.S. Pat. No. 5,384,367, column 8, line 41 to column 11, line 10.

Suitable polyanhydrides include addition polymers and oligomers typically used in film-forming compositions such as acrylic and vinyl polymers.

Examples of polyanhydrides suitable for use as curing agents in the curable compositions of the present invention include those described in U.S. Pat. No. 4,798,746 at column 10, lines 16–50; and in U.S. Pat. No. 4,732,790 at column 3, lines 41–57.

The crosslinking agent is typically present in the thermosetting compositions of the present invention in an amount of at least 10 percent by weight, preferably at least 25 percent by weight, based on total resin solids weight of the composition. The crosslinking agent is also typically present in the composition in an amount of less than 90 percent by weight, preferably less than 75 percent by weight, based on total resin solids weight of the composition. The amount of crosslinking agent present in the thermosetting composition of the present invention may range between any combination of these values, inclusive of the recited values.

The equivalent ratio of epoxide groups in the polymer to reactive functional groups in the crosslinking agent is typically within the range of 1;0.5 to 1:1.5, preferably 1:0.8 to 1:1.2.

Usually the thermosetting composition will also preferably contain catalysts to accelerate the cure of the crosslinking agent with reactive groups on the polymere(s). When the crosslinking agent is acid functional, basic esterification catalysts are typically used and the thermosetting composition of the present invention may comprise one or two packages. To form one-package compositions, the thermosetting composition of the present invention is substantially free of basic esterification catalyst. In a preferred embodiment, the composition of the present invention has no or only small amounts of basic esterification catalyst such that the composition is stable for a time sufficient to allow formulation of the composition as a single component; i.e., one-package, composition.

To form multi-package or multi-component compositions in which the epoxy functional polymer and acid functional crosslinking agent are present in separate packages and combined shortly before application, an esterification catalyst to promote cure can be included in the composition. A number of such catalysts are known in the art. These catalysts include basic materials such as secondary amine catalysts, for example, piperidine; tertiary amine catalysts such as methyl dicocoamine, N,N-dimethyldodecylamine, pyridine, and N,N-dimethylaniline; ammonium compounds, including tetrabutylammonium bromide, tetrabutylammonium hydroxide, and tetrabutylammonium acetate; phosphonium compounds, including ethyltriphenylphosphonium acetate and tetrabutyl phosphonium bromide; and other ammonium and phosphonium salts.

Suitable catalysts for polyamine crosslinking agents include tertiary amines as are known in the art.

The catalyst is usually present in an amount of about 0.05 to about 5.0 percent by weight, preferably about 0.25 to about 2.0 percent by weight, based on the total weight of resin solids in the thermosetting composition.

The thermosetting composition of the present invention is preferably used as a film-forming (coating) composition, and may contain adjunct ingredients conventionally used in such compositions. Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to about 40% by weight based on the total weight of resin solids.

The thermosetting composition of the present invention is typically a liquid and may be waterborne, but is usually solventborne. Suitable solvent carriers include the various esterg, ethers, and aromatic solvents, including mixtures thereof, that are known in the art of coating formulation. The composition typically has a total solids content of about 40 to about 80 percent by weight.

The thermosetting composition of the present invention may contain color pigments conventionally used in surface coatings and may be used as a monocoat; that is, a pigmented coating. Suitable color pigments include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

In general, the pigment is incorporated into the coating composition in amounts up to about 80 percent by weight based on the total weight of coating solids. The metallic pigment is employed in amounts of about 0.5 to about 25 percent by weight based on the total weight of coating solids.

As stated above, the thermosetting compositions of the present invention may be used in a method of coating a substrate comprising applying a thermosetting composition to the substrate, coalescing the thermosetting composition over the substrate in the form of a substantially continuous film, and curing the thermosetting composition.

The compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

After application of the composition to the substrate, the composition is allowed to coalesce to form a substantially continuous film on the substrate. Typically, the film thickness will be about 0.01 to about 5 mils (about 0.254 to about 127 microns), preferably about 0.1 to about 2 mils (about 2.54 to about 50.8 microns) in thickness. The film is formed on the surface of the substrate by driving solvent, i.e., organic solvent and/or water, out of the film by heating or by an air drying period. Preferably, the heating will only be for a short period of time, sufficient to ensure that any subsequently applied coatings can be applied to the film without dissolving the composition. Suitable drying conditions will depend on the particular composition, but in general a drying time of from about 1 to 5 minutes at a temperature of about 68–250° F. (20–121° C.) will be adequate. More than one coat of the composition may be applied to develop the optimum appearance. Between coats the previously applied coat may be flashed; that is, exposed to ambient conditions for about 1 to 20 minutes.

The film-forming composition of the present invention is preferably used as the clear coat layer in a multi-component composite coating composition such as a "color-plus-clear" coating system, which includes at least one pigmented or colored base coat and at least one clear topcoat. In this embodiment, the clear film-forming composition may include the thermosetting composition of the present invention.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes. Polymers prepared using atom transfer radical polymerization may also be used as resinous binders in the base coat.

The base coat compositions may be solventborne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

The base coat contains pigments to give it color. Suitable pigments include those discussed above. In general, the pigment is incorporated into the coating composition in amounts of about 1 to 80 percent by weight based on weight of coating solids. Metallic pigment is employed in amounts of about 0.5 to 25 percent by weight based on weight of coating solids.

If desired, the base coat composition may contain additional materials well known in the art of formulated surface coatings, including those discussed above. These materials can constitute up to 40 percent by weight of the total weight of the coating composition.

The base coating compositions can be applied to various substrates to which they adhere by conventional means, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to 5 mils (0.254 to 127 microns), preferably 0.1 to 2 mils (2.54 to 50.8 microns) in thickness.

After application of the base coat to the substrate, a film is formed on the surface of the substrate by driving solvent out of the base coat film by heating or by an air drying period, sufficient to ensure that the clear coat can be applied to the base coat without the former dissolving the base coat composition, yet insufficient to fully cure the base coat. More than one base coat and multiple clear coats may be applied to develop the optimum appearance. Usually between coats, the previously applied coat is flashed.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate may be heated to cure the coating layer(s). In the curing operation, solvents are driven off and the film-forming materials in the composition are crosslinked. The heating or curing operation is usually carried out at a temperature in the range of from 160–350° F. (71–177° C.) but if needed, lower or higher temperatures may be used as necessary to activate crosslinking mechanisms.

The invention will be further described by reference to the following examples. Unless otherwise indicated, all parts are by weight.

The following examples (A through V) illustrate the preparation of various resins for use in thermosetting compositions. Example A illustrates the preparation of a polyacid curing agent. Examples B through V demonstrate resins prepared via atom transfer radical polymerization and comparative resins prepared via conventional polymerization methods.

EXAMPLE A

A polyacid curing agent was prepared as follows: An initial solvent portion and the pentaerythritol were charged into a four-neck flask, which served as the reaction vessel, and which was equipped with a thermocouple, a reflux condenser and a stirrer. The initial charge was heated to 125° C. under a nitrogen gas blanket. Charge 2 was added dropwise from an addition funnel into the reaction vessel over a period of 1 to 2 hours while maintaining the reaction at 125° C. and under a nitrogen gas blanket. After the completion of the addition, the reaction mixture was cooled to 115° C. and held at that temperature for 4 hours. Charge 3 was then added to the reaction mixture. The reaction was then held at 105° C. under a nitrogen blanket for 30 minutes, after which the reaction mixture was cooled and poured. The reaction mixture was analyzed for solids content, acid number and weight average molecular weight as determined by gel permeation chromatography using a polystyrene standard. The aforementioned measured characteristics of the copolymer were obtained by procedures based on the following American Society of Testing Materials (ASTM) standard methods: D-2369 for percent solids and D-1639 for acid number.

In the preparation of the polyacid curing agent of Example A, n-amyl propionato and pentaerythritol were the components of the initial charge which were charged into the reaction vessel in the parts by weight shown in the table below. The methylhexahydrophthalic anhydride was added as Charge 2 in the parts shown in the table. n-Propyl alcohol was added as Charge 3 in the parts by weight shown in the table.

| Components | Parts |
|---|---|
| Initial Charge | |
| n-Amyl propionate | 177.2 |
| Pentaerythritol | 136.2 |
| Charge 2 | |
| Methylhexahydrophthalic anhydride | 659.3 |
| Rinse (n-Amyl propionate) | 10.0 |
| Charge 3 | |
| n-Propyl alcohol | 187.2 |
| Resin Properties | |
| % Solids (110° C./1 hour) | 71.0 |
| Acid Value | 183.0 |
| Weight average molecular weight | 610 |

EXAMPLE B (COMPARATIVE)

The following initial charge and feeds were used in the preparation of random acrylic copolymer containing 33 percent by weight glycidyl methacrylate via solution polymerization technique.

| Ingredients | Parts by weight |
|---|---|
| Initial Charge | |
| Xylene | 326.0 |
| Feed 1 | |
| Glycidyl methacrylate | 198.0 |
| Isobutyl methacrylate | 402.0 |
| VAZO-67[1] | 15.0 |
| Feed 2 | |
| Xylene | 10.0 |
| VAZO-67 | 6.0 |

[1]2,2'-Azobis (2-methylbutanenitrile), commercially available from E. I. du Pont de Nemours and Company.

The initial charge was heated in a reactor with agitation to reflux temperature (141° C.). Then Feed 1 was added over a period of 3 hours. At the completion of Feed 1, the reaction mixture was held at reflux (142° C.) for 1 hour. Then the reaction mixture Cooled to 100° C. and Feed 2 was added over 10 minutes at this temperature. After the completion of the addition of Feed 2, the reaction mixture held at 98–100° C. for 2 hours. The resultant acrylic polymer had a total solids content of 68.1 percent determined at 110° C. for one hour and number average molecular weight of 3036 as determined by gel permeation chromatography (GPC) using polystyrene as standard. The polydispersity of the resultant polymer was 2.8.

EXAMPLE C

The triblock copolymer IBMA-b-CMA-b-IBMA (33% by weight glycidyl methacrylate) was prepared with the following ingredients using atom transfer radical polymerization technique in xylene:

| | Ingredients | Parts by weight (grams) |
|---|---|---|
| Charge 1 | Xylene | 100.88 |
| | Copper (II) bromide | 5.36 |
| | Copper | 12.71 |
| | 2,2'-Bypyridyl | 7.50 |
| | Diethyl-2-bromo-2-methylmalonate | 50.62 |
| | IBMA | 170.40 |
| Charge 2 | Xylene | 100.88 |
| | GMA | 170.40 |
| Charge 3 | Xylene | 100.88 |
| | IBMA | 170.40 |

Charge 1 was heated in a reaction vessel with agitation at 90° C. and the reaction mixture was held at this temperature for 1.5 hours. The reaction mixture was cooled to 70° C. and charge 2 was added over a period of 15 minutes. The reaction mixture was held at this temperature for 2 hours. The reaction mixture was heated to 90° C. and charge 3 was added over a period of 15 minutes and the reaction mixture was held at this temperature for 1.5 hours. The reaction mixture was cooled and filtered. The resultant triblock copolymer had a total solid content of 65 percent determined at 110° C. for one hour. The copolymer had number average molecular weight, $M_n$=2960 and polydispersity $M_w/M_n$=1.3 (determined by gel permeation chromatography using polystyrene as a standard), with theoretical $M_n$=2810. Epoxy titration equivalent=783.3.

EXAMPLES D, G. L (COMPARATIVE)

The following example show the preparation of random acrylic copolymers containing 42, 50 and 67 percent by weight glycidyl methacrylate by the same polymerization technique that was described in Example B, above.

| | EXAMPLE | | |
|---|---|---|---|
| INGREDIENT | D | G | L |
| Initial Charge | | | |
| Xylene | 326.0 | 326.0 | 326.0 |
| Feed 1 | | | |
| Glycidyl methacrylate | 252.0 | 300.0 | 396.0 |
| Isobutyl methacrylate | 348.0 | 300.0 | 204.0 |
| VAZO-67 | 15.0 | 15.0 | 15.0 |
| Feed 2 | | | |
| Xylene | 10.0 | 10.0 | 10.0 |
| VAZO-67 | 6.0 | 6.0 | 6.0 |

The resultant random acrylic polymers had the following properties:

| | D | G | L |
|---|---|---|---|
| Glycidyl methacrylate content (% by weight of the polymer) | 42 | 50 | 67 |
| Total solids content, 110° C. for 1 hour (% by weight) | 66.7 | 66.0 | 66.8 |
| Number average molecular determined by GPC | 3172 | 3122 | 2967 |
| Polydispersity | 2.8 | 2.8 | 2.9 |

EXAMPLE E

The triblock copolymer IBMA-b-GMA-b-IBMA (42% by weight glycidyl methacrylate) was prepared with the following ingredients using atom transfer radical polymerization technique in xylene:

| | Ingredients | Parts by weight (grams) |
|---|---|---|
| Charge 1 | Xylene | 100.88 |
| | Copper (II) bromide | 5.36 |
| | Copper | 12.71 |
| | 2,2'-Bypyridyl | 7.50 |
| | Diethyl-2-bromo-2-methylmalonate | 50.62 |
| | IBMA | 147.89 |
| Charge 2 | Xylene | 100.88 |
| | GMA | 215.84 |
| Charge 3 | Xylene | 100.87 |
| | IBMA | 147.68 |

The copolymer was prepared in the same way as the polymer of example C. The resultant triblock copolymer had a total solid content of 65 percent determined at 110° C. for one hour. The copolymer had number average molecular weight, $M_n$=2970 and polydispersity $M_w/M_n$=1.4 (determined by gel permeation chromatography using polystyrene as a standard), with theoretical $M_n$=2810. Epoxy titration equivalent 689.2.

EXAMPLE F

The triblock copolymer GMA-b-IBMA-b-GMA (42% by weight glycidyl methacrylate) was prepared with the following ingredients using atom transfer radical polymerization technique in xylene:

| | Ingredients | Parts by weight (grams) |
|---|---|---|
| Charge 1 | Xylene | 100.91 |
| | Copper (II) bromide | 3.13 |
| | Copper | 12.71 |
| | 2,2'-Bypyridyl | 4.37 |
| | Diethyl-2-bromo-2-methylmalonate | 50.62 |
| | GMA | 107.92 |
| Charge 2 | Xylene | 100.91 |
| | IBMA | 295.78 |
| Charge 3 | Xylene | 100.91 |
| | GMA | 107.92 |

Charge 1 was heated in a reaction vessel with agitation at 70° C. and the reaction mixture was held at this temperature for 1.5 hours. The reaction mixture was heated to 90° C. and charge 2 was added over a period of 15 minutes. The reaction mixture was held at this temperature for 2 hours. The reaction mixture was cooled to 70° C. and charge 3 was added over a period of 15 minutes and the reaction mixture was held at this temperature for 1.5 hours. The reaction mixture was cooled and filtered. The resultant triblock copolymer had a total solid content of 65 percent determined at 11° C. for one hour. The copolymer had number average molecular weight, $M_n$=2750 and polydispersity $M_w/M_n$=1.5 (determined by gel permeation chromatography using polystyrene as a standard), with theoretical $M_n$=2810. Epoxy titration equivalent 738.6.

EXAMPLE H

The triblock copolymer IBMA-b-GMA-b-IBMA (50% by weight glycidyl methacrylate) was prepared with the following ingredients using atom transfer radical polymerization technique in xylene:

| | Ingredients | Parts by weight (grams) |
|---|---|---|
| Charge 1 | Xylene | 100.88 |
| | Copper (II) bromide | 3.13 |
| | Copper | 12.71 |
| | 2,2'-Bypyridyl | 4.37 |
| | Diethyl-2-bromo-2-methylmalonate | 50.62 |
| | IBMA | 127.98 |
| Charge 2 | Xylene | 100.88 |
| | GMA | 255.60 |
| Charge 3 | Xylene | 100.87 |
| | IBMA | 127.80 |

The copolymer was prepared in the same way as the polymer of example C The resultant triblock copolymer had a total solid content of 65 percent determined at 110° C. for one hour. The copolymer had number average molecular weight, $M_n$=2820 and polydispersity $M_w/M_n$=1.3 (determined by gel permeation chromatography using polystyrene as a standard), with theoretical $M_n$=2810. Epoxy titration equivalent 505.7.

EXAMPLE I

The triblock copolymer GMA-b-IBMA-b-GMA (50% glycidyl methacrylate) was prepared with the following ingredients using atom transfer radical polymerization technique in xylene:

| | Ingredients | Parts by weight (grams) |
|---|---|---|
| Charge 1 | Xylene | 100.91 |
| | Copper (II) bromide | 3.13 |
| | Copper | 12.71 |
| | 2,2'-Bypyridyl | 4.37 |
| | Diethyl-2-bromo-2-methylmalonate | 50.62 |
| | GMA | 127.80 |
| Charge 2 | Xylene | 100.91 |
| | IBMA | 255.96 |
| Charge 3 | Xylene | 100.91 |
| | GMA | 127.80 |

The copolymer was prepared in the same way as the polymer of example F. The resultant triblock copolymer had a total solid content of 65 percent determined at 110° C. for one hour. The copolymer had number average molecular weight, $M_n$=2670 and polydispersity $M_w/M_n$=1.4 (determined by gel permeation chromatography using polystyrene as a standard), with theoretical $M_n$=2810. Epoxy titration equivalent 612.1

EXAMPLE J

The triblock copoilymer IDMA-b-QMA-b-IBMA (50% glycidyl methacrylate) was prepared with the following ingredients using atom transfer radical polymerization technique in xylene:

| | Ingredients | Parts by weight (grams) |
|---|---|---|
| Charge 1 | Xylene | 53.79 |
| | Copper (II) bromide | 4.69 |
| | Copper | 19.06 |

-continued

| | Ingredients | Parts by weight (grams) |
|---|---|---|
| | 2,2'-Bypyridyl | 6.56 |
| | Diethyl-2-bromo-2-methylmalonate | 75.93 |
| | IBMA | 85.32 |
| Charge 2 | Xylene | 107.58 |
| | GMA | 213.00 |
| Charge 3 | Xylene | 53.80 |
| | IBMA | 127.80 |

The copolymer was prepared in the same way as the polymer of example C. The resultant triblock copolymer had a total solid content of 70 percent determined at 110° C. for one hour. The copolymer had number average molecular weight, $M_n$=1690 and polydispersity $M_w/M_n$=1.4 (determined by gel permeation chromatography using polystyrene as a standard), with theoretical $M_n$=1670. Epoxy titration equivalent 510.

EXAMPLE K

The diblock copolymer IBMA-b-GMA (50% glycidyl methacrylate) was prepared with the following ingredients using atom transfer radical polymerization technique in xylene:

| | Ingredients | Parts by weight (grams) |
|---|---|---|
| Charge 1 | Xylene | 126.87 |
| | Copper (II) bromide | 3.13 |
| | Copper | 12.71 |
| | 2,2'-Bypyridyl | 4.37 |
| | Diethyl-2-bromo-2-methylmalonate | 50.62 |
| | IBMA | 210.46 |
| Charge 2 | Xylene | 126.87 |
| | GMA | 210.16 |

Charge 1 was heated in a reaction vessel with agitation at 90° C. and the reaction mixture was held at this temperature for 1.5 hours. The reaction mixture was cooled to 70° C. and charge 2 was added over a period of 15 minutes. The reaction mixture was held at this temperature for 2 hours. The reaction mixture was cooled and filtered. The resultant triblock copolymer had a total solid content of 65 percent determined at 110° C. for one hour.

The copolymer had number average molecular weight, $M_n$=2180 and polydispersity $M_w/M_n$=1.3 (determined by gel permeation chromatography using polystyrene as a standard), with theoretical $M_n$=2360. Epoxy titration equivalent 552.7.

EXAMPLE M

The triblock copolymer IBMA-b-GMA-b-IBMA (67% glycidyl methacrylate) was prepared with the following ingredients using atom transfer radical polymerization technique in xylene:

| | Ingredients | Parts by weight (grams) |
|---|---|---|
| Charge 1 | Xylene | 75.65 |
| | Copper (II) bromide | 3.13 |

-continued

| | Ingredients | Parts by weight (grams) |
|---|---|---|
| | Copper | 12.71 |
| | 2,2'-Bypyridyl | 4.37 |
| | Diethyl-2-bromo-2-methylmalonate | 50.62 |
| | IBMA | 85.32 |
| Charge 2 | Xylene | 151.29 |
| | GMA | 340.80 |
| Charge 3 | Xylene | 75.64 |
| | IBMA | 85.20 |

The copolymer was prepared in the same way as the polymer of example C The resultant triblock copolymer had a total solid content of 65 percent determined at 110° C. for one hour. The copolymer had number average molecular weight, $M_n$=2970 and polydispersity $M_w/M_n$=1.3 (determined by gel permeation chromatography using polystyrene as a standard), with theoretical $M_n$=2810. Epoxy titration equivalent 423.1.

EXAMPLE N

PolyGMA was prepared with the following ingredients using atom transfer radical polymerization technique in xylene:

| | Ingredients | Parts by weight (grams) |
|---|---|---|
| Charge 1 | Xylene | 410.25 |
| | Copper (II) bromide | 3.13 |
| | Copper | 12.71 |
| | 2,2'-Bypyridyl | 4.69 |
| | Diethyl-2-bromo-2-methylmalonate | 253.10 |
| | GMA | 568.00 |

Charge 1 was heated in a reaction vessel with agitation at 70° C. and the reaction mixture was held at this temperature for 2 hours. The reaction mixture was cooled and filtered. The resultant homopolymer had a total solid content of 80 percent determined at 110° C. for one hour. The copolymer had number average molecular weight, $M_n$=800 and polydispersity $M_w/M_n$=1.2 (determined by gel permeation chromatography using polystyrene as a standard), with theoretical $M_n$=820. Epoxy titration equivalent 278.9.

EXAMPLE O (COMPARATIVE)

The following initial charge and feeds were used in the preparation of random acrylic terpolymer containing 50 percent by weight glycidyl methacrylate and 25% by weight each isobutyl methacrylate and styrene, via solution polymerization technique.

| Ingredients | Parts by Weight |
|---|---|
| Initial Charge | |
| SOLVESSO-100[1] | 326.0 |
| Feed 1 | |
| Glycidyl methacrylate | 300.0 |
| Isobutyl methacrylate | 150.0 |
| Styrene | 150.0 |
| VAZO-67 | 6.0 |

-continued

| Ingredients | Parts by Weight |
|---|---|
| Feed 2 | |
| SOLVESSO-100 | 10.0 |
| VAZO-67 | 6.0 |
| Feed 3 | |
| SOLVESSO-100 | 10.0 |
| VAZO-67 | 6.0 |

[1]Blend of aromatic hydrocarbons, commercially available from Exxon Chemical Company.

The initial charge was heated in a reactor with agitation to reflux temperature (156° C.). Then Feed 1 was added over a period of 3 hours. At the completion of Feed 1, the reaction mixture was held at reflux (166–168° C.) for 1 hour. Then the reaction mixture cooled to 100° C. and Feed 2 was added over 10 minutes at this temperature. After the completion of the addition of Feed 2, the reaction mixture held at 100–102° C. for one hour. At the end of the held, Feed 3 was added over 10 minutes and the reaction mixture was held at 103° C. for 2 hours. The resultant acrylic polymer had a total solids content of 67.2 percent determined at 110° C. for one hour and number average molecular weight of 2435 as determined by GPC using polystyrene as standard. The polydispersity of the resultant polymer was 3.7.

EXAMPLE P

The triblock copolymer IBMA-b-GMA-b-Styrene (50% glycidyl methacrylate, 25% isobutyl methacrylate, 25% styrene by weight) was prepared with the following ingredients using atom transfer radical polymerization technique in xylene:

| | Ingredients | Parts by weight (grams) |
|---|---|---|
| Charge 1 | Xylene | 50.36 |
| | Copper (II) bromide | 3.13 |
| | Copper | 12.71 |
| | 2,2'-Bypyridyl | 4.37 |
| | Diethyl-2-bromo-2-methylmalonate | 50.62 |
| | IBMA | 105.23 |
| Charge 2 | Xylene | 100.88 |
| | GMA | 210.16 |
| Charge 3 | Xylene | 50.35 |
| | Styrene | 104.00 |

Charge 1 was heated in a reaction vessel with agitation at 90° C. and the reaction mixture was held at this temperature for 1.5 hours. The reaction mixture was cooled to 70° C. and charge 2 was added over a period of 15 minutes. The reaction mixture was held at this temperature for 2 hours. The reaction mixture was heated to 100° C. and charge 3 was added over a period of 15 minutes and the reaction mixture was held at this temperature for 2 hours. The reaction mixture was cooled and filtered. The resultant triblock copolymer had a total solid content of 70 percent determined at 110° C. for one hour.

The copolymer had number average molecular weight, $M_n$=2470 and polydispersity $M_w/M_n$=2 (determined by gel permeation chromatography using polystyrene as a standard), with theoretical $M_n$=2350. The resin had molar composition 50 percent GMA, 18 percent Styrene and 32 percent IBMA as determined by $^1$H-NMR. Epoxy titration equivalent 580.4.

EXAMPLE Q (COMPARATIVE)

The following initial charge and feeds were used in the preparation of random acrylic terpolymer containing 50 percent by weight glycidyl methacrylate via solution polymerization technique.

| Ingredients | Parts by Weight |
|---|---|
| Initial Charge | |
| SOLVESSO-100 | 326.0 |
| Feed 1 | |
| Glycidyl methacrylate | 300.0 |
| Isobutyl methacrylate | 150.0 |
| 2-Ethylhexyl acrylate | 150.0 |
| VAZO-67 | 12.0 |
| Feed 2 | |
| SOLVESSO-100 | 10.0 |
| VAZO-67 | 6.0 |

The initial charge was heated in a reactor with agitation to reflux temperature (1560° C.). Then Feed 1 wag added over a period of 3 hours At the completion of Feed 1, the reaction mixture was held at reflux (165–166° C.) for 1 hour. Then the reaction mixture cooled to 100° C. and Feed 2 was added over 10 minutes at this temperature. After the completion of the addition of Feed 2, the reaction mixture held at 102–103° C. for 2 hours. The resultant acrylic polymer had a total solids content of 64.0 percent determined at 110° C. for one hour and number average molecular weight of 1983 as determined by GPC using polystyrene as standard. The polydispersity of the resultant polymer was 2.3.

EXAMPLE R

The triblock copolymer IBMA-b-GMA-b-2-EHA (48% by weight glycidyl methacrylate, 24% by weight isobutyl methacrylate, 28% by weight 2-ethylhexyl acrylate) was prepared with the following ingredients using atom transfer radical polymerization technique in xylene:

| | Ingredients | Parts by weight (grams) |
|---|---|---|
| Charge 1 | Xylene | 50.36 |
| | Copper (II) bromide | 3.13 |
| | Copper | 12.71 |
| | 2,2'-Bypyridyl | 4.37 |
| | Diethyl-2-bromo-2-methylmalonate | 50.62 |
| | IBMA | 105.23 |
| Charge 2 | Xylene | 100.88 |
| | GMA | 210.16 |
| Charge 3 | Xylene | 50.35 |
| | 2-EHA | 121.62 |

Charge 1 was heated in a reaction vessel with agitation at 90° C. and the reaction mixture was held at this temperature for 1.5 hours. The reaction mixture was cooled to 70° C. and charge 2 was added over a period of 15 minutes. The reaction mixture was held at this temperature for 2 hours. The reaction mixture was heated to 100° C. and charge 3 was added over a period of 15 minutes and the reaction mixture was held at this temperature for 2 hours. The reaction mixture was cooled and filtered. The resultant triblock copolymer had a total solid content of 70 percent determined at 110° C. for one hour.

The copolymer had number average molecular weight, $M_n$=2320 and polydispersity $M_w/M_n$=1.5 (determined by gel permeation chromatography using polystyrene as a standard), with theoretical $M_n$=2440. The resin had molar composition 51.4 percent GMA, 22.9 percent 2-EHA and 25.7 percent IBMA as determined by $^{1}H$-NMR. Epoxy titration equivalent 580.4.

EXAMPLE S (COMPARATIVE)

The following initial charge and feeds were used in the preparation of random acrylic copolymer with glycidyl and hydroxyl functional groups via solution polymerization technique.

| Ingredients | Parts by Weight |
|---|---|
| Initial Charge | |
| Xylene | 500.0 |
| n-Butanol | 125.0 |
| Feed 1 | |
| Glycidyl methacrylate | 300.0 |
| Isobutyl methacrylate | 150.0 |
| Hydroxypropyl methacrylate | 150.0 |
| VAZO-67 | 15.0 |
| Feed 2 | |
| Xylene | 8.0 |
| n-Butanol | 2.0 |
| VAZO-67 | 6.0 |

The initial charge was heated in a reactor with agitation to reflux temperature (126° C.). Then Feed 1 was added over a period of 3 hours. At the completion of Feed 1, the reaction mixture was held at reflux for 1 hour. Then the reaction mixture cooled to 100° C. and Feed 2 was added over 10 minutes at this temperature. After the completion of the addition of Feed 2, the reaction mixture held at 100° C. for 2 hours. The resultant acrylic polymer had a total solids content of 51.0 percent determined at 110° C. for one hour and number average molecular weight of 2987 as determined by gel permeation chromatography (GPC) using polystyrene as standard. The polydispersity of the resultant polymer was 2.0.

EXAMPLE T

The triblock copolymer IBMA-b-GMA-b-HPMA (50% by weight glycidyl methacrylate, 25% by weight isobutyl methacrylate, 25% by weight styrene) was prepared with the following ingredients using atom transfer radical polymerization technique in xylene:

| | Ingredients | Parts by weight (grams) |
|---|---|---|
| Charge 1 | Xylene | 63.63 |
| | Copper (II) bromide | 3.13 |
| | Copper | 5.08 |
| | 2,2'-Bypyridyl | 4.37 |
| | Diethyl-2-bromo-2-methylmalonate | 50.62 |
| | IBMA | 105.23 |
| Charge 2 | Xylene | 127.26 |
| | GMA | 210.16 |
| Charge 3 | Xylene | 63.63 |
| | Styrene | 106.69 |

Charge 1 was heated in a reaction vessel with agitation at 90° C. and the reaction mixture was held at this temperature for 1.5 hours. The reaction mixture was cooled to 70° C. and charge 2 was added over a period of 15 minutes. The reaction mixture was held at this temperature for 2 hours. The reaction mixture was heated to 100° C. and charge 3 was added over a period of 15 minutes and the reaction mixture was held at this temperature for 2 hours. The reaction mixture was cooled and filtered. The resultant triblock copolymer had a total solid content of 65 percent determined at 110° C. for one hour. The copolymer had number average molecular weight, $M_n$=2800 and polydispersity $M_w/M_n$=1.5 (determined by gel permeation chromatography using polystyrene as a standard), with theoretical $M_n$=2370. The resin had molar composition 50 percent GMA, 25 percent HPMA and 25 percent IBMA as determined by $^{1}H$-NMR. Epoxy titration equivalent 588.0.

EXAMPLE U (COMPARATIVE)

This example was prepared in a manner similar to that of Example O but in which cyclohexyl methacrylate was used to replace styrene. The final acrylic terpolymer had a total solids content of 68.0 percent determined at 110° C. for one hour and number average molecular weight of 2758 as determined by GPC using polystyrene as standard. The polydispersity of the resultant polymer was 3.5.

EXAMPLE V

The triblock copolymer IBMA-b-GMA-b-CHMA (48% by weight glycidyl methacrylate, 24% b weight isobutyl methacrylate, 28% by weight cyclohexyl methacrylate) was prepared with the following ingredients using atom transfer radical polymerization technique in xylene:

| | Ingredients | Parts by weight (grams) |
|---|---|---|
| Charge 1 | Xylene | 52.55 |
| | Copper (II) bromide | 3.13 |
| | Copper | 12.71 |
| | 2,2'-Bypyridyl | 4.37 |
| | Diethyl-2-bromo-2-methylmalonate | 50.62 |
| | IBMA | 105.23 |
| Charge 2 | Xylene | 105.10 |
| | GMA | 210.16 |
| Charge 3 | Xylene | 52.55 |
| | CHMA | 124.50 |

Charge 1 was heated in a reaction vessel with agitation at 90° C. and the reaction mixture was held at this temperature for 1.5 hours. The reaction mixture was cooled to 70° C. and charge 2 was added over a period of 15 minutes. The reaction mixture was held at this temperature for 2 hours. The reaction mixture was heated to 100° C. and charge 3 was added over a period of 15 minutes and the reaction mixture was held at thi5 temperature for 2 hours. The reaction mixture was cooled and filtered. The resultant triblock copolymer had a total solid content of 70 percent determined at 110° C. for one hour.

The copolymer had number average molecular weight, $M_n$=2290 and polydispersity $M_w/M_n$=1.2 (determined by gel permeation chromatography using polystyrene as a standard), with theoretical $M_n$=2450. The resin had molar composition 50 percent GMA, 25 percent CHMA and 25 percent IBMA as determined by $^{1}H$-NMR. Epoxy titration equivalent 590.4.

The resins of Examples A through V were used to prepare clear thermosetting film-forming compositions by mixing together ingredients as shown in Examples 1 through 22. Each composition contained 3.0 grams TINUVIN 328 (2-(2'-Hydroxy-3',5'-ditert-amylphenyl) benzotriazole UV light stabilizer available from Ciba-Geigy Corp.); 1.0 grams TINUVIN 292 (Bis(1,2,2,6,6-pentamethyl-4-piperidinyl) sebacate hindered amine stabilizer available from Ciba-Geigy corp.); 0.5 grams polybutyl acrylate (flow control agent having a Mw of about 6700 and a Mn of about 2600, made in xylene at 62.5% solids); and additional ingredients as listed in the tables below.

| Ingredient/Example | 1C* | 2 | 3C | 4 | 5 | 6C | 7 | 8 | 9 | 10 | | |
|---|---|---|---|---|---|---|---|---|---|---|---|---|
| Ethyl 3-ethoxypropionate | 66.2 | 60.9 | 71.6 | 64.9 | 63.7 | 71.9 | 64.1 | 60.4 | 62.2 | 64.5 | | |
| Polyepoxide Example | B | C | D | E | F | G | H | I | J | K | | |
| Amount of Polyepoxide | 93.1 | 95.5 | 87.1 | 86.1 | 82.2 | 82.0 | 76.2 | 79.7 | 70.7 | 78.3 | | |
| Polyacid curing agent of Example A | 47.1 | 47.1 | 54.9 | 54.9 | 54.9 | 60.7 | 60.7 | 60.7 | 60.7 | 61.5 | | |
| N,N-Dimethyldodecyl amine | 0.3 | 0.3 | 0.3 | 0.3 | 0.3 | 0.3 | 0.3 | 0.3 | 0.3 | 0.3 | | |
| **Ingredient/Example** | **11C** | **12** | **13** | **14C** | **15** | **16C** | **17** | **18C** | **19** | **20C** | **21** | **22** |
| Ethyl 3-ethoxypropionate | 72.6 | 65.5 | 54.8 | 75.4 | 64.0 | 50.0 | 57.7 | 42.4 | 68.6 | 78.2 | 59.6 | 8.3 |
| Polyepoxide Example | L | M | N | 0 | P | Q | R | S | T | U | V | V |
| Amount of Polyepoxide | 71.1 | 69.0 | 58.4 | 80.5 | 76.7 | 84.5 | 76.8 | 106.1 | 73.9 | 79.6 | 77.8 | 95.1 |
| Polyacid curing agent of Example A | 70.4 | 70.4 | 72.2 | 60.7 | 60.7 | 60.7 | 60.7 | 60.7 | 60.7 | 60.7 | 60.7 | — |
| Dodecanedioic acid (DDDA) (33.9% in m-Pyrol) | — | — | — | — | — | — | — | — | — | — | — | 86.4 |
| N,N-Dimethyldodecyl amine | 0.3 | 0.3 | 0.3 | 0.3 | 0.3 | 0.3 | 0.3 | 0.3 | 0.3 | 0.3 | 0.3 | 0.3 |

*Comparative Example (polyepoxide prepared via conventional polymerization methods)

The film-forming compositions of Examples 1 through 22 were spray applied to a pigmented base coat to form color-plus-clear composite coatings over electrocoated steel substrates. The panels coated with ED 5000 electrocoat and GPXH-5379 primer, both available from PPG Industries, Inc. The base coat is available from PPG Industries, Inc., as BWB-8555.

The base coat was spray applied in two coats to electrocoated, primed steel panels at a temperature of about 75° F. (24° C.), with no flash between the two base coat applications. After the second base coat application, a flash time of five minutes at 200° F. (93.3° C.) was allowed before application of the clear coating composition. The clear coating compositions of Examples 1–22 were each applied to a base coated panel in two coats with a sixty-second flash at 75° F. (24° C.) between the coats. The composite coating was allowed to air flash at 75° F. (24° C.) for five minutes. Panels were baked 30 minutes at 285° F. (141° C.) to cure both the base coat and the clear coat. The panels were baked in a horizontal position. Composition properties are shown in the table below.

| | | #4 Ford Cup Viscosity (Seconds) | | | | | Clear Film |
|---|---|---|---|---|---|---|---|
| Example | % Weight Solids | Initial | After 17 days (8 days 100° F.) | 20° Gloss[1] | Dorigon DOT[2] | Knoop Hardness[3] | Thickness (Mils) |
| 1C | 47.3 | 24.7 | +40 | 81 | 98 | 13.0 | 1.9 |
| 2 | 49.7 | 24.4 | +26 | 81 | 93 | 11.6 | 2.1 |
| 3C | 46.8 | 24.2 | +58 | 81 | 97 | 14.4 | 2.0 |
| 4 | 49.7 | 24.6 | +46 | 81 | 99 | 12.6 | 2.0 |
| 5 | 49.5 | 23.1 | +28 | 81 | 97 | 13.8 | 2.1 |
| 6C | 47.6 | 24.7 | +100 | 82 | 98 | 14.4 | 2.0 |
| 7 | 50.4 | 25.2 | +61 | 83 | 98 | 15.0 | 2.0 |
| 8 | 49.9 | 25.0 | +76 | 82 | 98 | 13.9 | 1.8 |
| 9 | 51.3 | 24.2 | +41 | 82 | 92 | 12.8 | 1.9 |
| 10 | 50.8 | 25.2 | +57 | 83 | 98 | 12.4 | 2.0 |
| 11C | 48.2 | 24.5 | +273 | 83 | 98 | 14.5 | 1.7 |
| 12 | 50.5 | 24.6 | +121 | 83 | 98 | 13.8 | 1.7 |
| 13 | 56.9 | 24.0 | +78 | 84 | 98 | 15.0 | 1.7 |
| 14C | 46.7 | 25.0 | +464 | 87 | 96 | 15.5 | 1.7 |
| 15 | 50.8 | 24.8 | +133 | 85 | 98 | 15.0 | 1.8 |
| 16C | 51.0 | 25.4 | +77 | 83 | 95 | 10.7 | 2.0 |
| 17 | 51.4 | 24.8 | +61 | 82 | 98 | 7.6 | 2.0 |
| 18C | 48.6 | 24.9 | +100 | 82 | 91 | 15.4 | 1.9 |
| 19 | 48.5 | 25.3 | +52 | 83 | 98 | 15.2 | 1.8 |
| 20C | 46.2 | 25.0 | +94 | 84 | 97 | 14.1 | 1.6 |
| 21 | 50.2 | 25.4 | +44 | 83 | 98 | 14.4 | 1.7 |
| 22 | 49.1 | 21.7 | +18 | 83 | 98 | 4.9 | 2.1 |

[1]20° Gloss measured with a MacBeth NOVOGLOSS Statistical 20 degree glossmeter. Higher numbers indicate better gloss. [2]DOI (distinctness of image) measured using a Dorigon II DOI meter from Hunter Lab. Higher numbers indicate better clarity. [3]Measured using a Tukon Microhardness Tester Model 300 from Wilson Instruments according to ASTM-D1474-92. Higher numbers indicate greater hardness.

The data in the table indicate that film-forming compositions of the present invention, prepared using polymers made by atom transfer radical polymerization techniques, have higher solids contents than comparative film-forming compositions prepared with conventional polymers. Moreover, the compositions of the present invention maintain stability with respect to viscosity, unlike the conventional counterparts. Appearance properties of cured films of the compositions of the present invention, however, are comparable to those of conventional compositions.

The present invention has been described with reference to specific details of particular embodiments thereof. It is not intended that such details be regarded as limitations upon the scope of the invention except insofar as and to the extent that they are included in the accompanying claims.

We claim:

1. A liquid thermosetting composition comprising:

(a) a crosslinking agent having at least two functional groups that are reactive with epoxide groups; and (b) a non-gelled, epoxy functional block copolymer prepared by atom transfer radical polymerization, in the presence of an initiator having at least one radically transferable group, and wherein the polymer contains the following polymer chain structure:

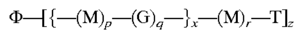

$$\Phi-[\{-(M)_p-(G)_q-\}_x-(M)_r-T]_z$$

wherein M is a residue, that is free of epoxy functionality, of at least one ethylenically unsaturated radically polymerizable monomer; G is a residue, that has epoxy functionality, of at least one ethylenically unsaturated radically polymerizable monomer; Φ is a residue from the initiator, free from the radically transferable group, selected from the group consisting of linear or branched aliphatic compounds, cycloaliphatic compounds, heterocyclic compounds, sulfonyl compounds, sulfenyl compounds, esters of carboxylic acids, polymeric compounds and mixtures thereof; T is or is derived from the radically transferable group and is selected from the group consisting of halide and a dehalogenation reaction product of a limited radically polymerizable ethylenically unsaturated compound; z represents the number of radically transferable groups; r, p and q represent average numbers of residues occurring in a block of residues in each polymer chain structure; z, r, p, q and x are each individually selected for each structure such that said epoxy functional block copolymer has a number average molecular weight of at least 250; p is an integer of from 1 to 100; q is an integer of from 1 to 15; and x is an integer of from 1 to 10; r is an integer from 3 to 100; z is at least 1; and wherein the epoxy functional polymer has an epoxy equivalent weight of from 128 to 10,000 grams/equivalent.

2. The thermosetting composition of claim 1 wherein the epoxy functional polymer has a number average molecular weight of from 500 to 16,000, and a polydispersity index of less than 2.0.

3. The thermosetting composition of claim 1 wherein M is a polymerized monomer from at least one monomer selected from the group consisting of vinyl monomers, (meth)allylic monomers, and olefins.

4. The thermosetting composition of claim 1 wherein M is a polymerized monomer from at least one monomer selected from the group consisting of alkyl (meth)acrylates having 1 to 20 carbon atoms in the alkyl group, unsaturated aromatic monomers and olefins.

5. The thermosetting composition of claim 1 wherein G is a polymerized monomer derived from at least one monomer selected from the group consisting of glycidyl acrylate, glycidyl methacrylate, 3,4-epoxycyclohexylmethyl(meth) acrylate, 2-2,4-epoxycyclohexyl)ethyl(meth)acrylate, and allyl glycidyl ether.

6. The thermosetting composition of claim 1 wherein the epoxy functional polymer has a number average molecular weight of from 500 to 16,000, and a polydispersity index of less than 1.8.

7. The thermosetting composition of claim 1 wherein T is a halide.

8. The thermosetting composition of claim 1 wherein said crosslinking agent is selected from the group consisting of polyamines, polyamides, polycarboxylic acids, and polyphenolic compounds.

9. The thermosetting composition of claim 8 wherein said crosslinking agent is selected from the group consisting of dodecanedioic acid, azelaic acid, adipic acid, 1,6-hexanedioic acid, succinic acid, pimelic acid, sebacic acid, maleic acid, citric acid, itaconic acid, aconitic acid, carboxylic acid-terminated polyesters, half-esters formed from reacting an acid anhydride with a polyol, and mixtures thereof.

10. The thermosetting composition of claim 1 wherein said epoxy functional polymer is selected from the group consisting of linear polymers, branched polymers, hyperbranched polymers, star polymers, graft polymers and mixtures thereof.

11. The thermosetting composition of claim 1 wherein said epoxy functional polymer has a polydispersity index of less than 1.50.

12. The thermosetting composition of claim 1 wherein the equivalent ratio of epoxy groups in (b) to reactive functional groups in (a) is within the range of 1:0.5 to 1:1.5.

13. The thermosetting composition of claim 1 wherein (a) is present in amounts of 10 to 90 percent by weight and (b) is present in amounts of 10 to 90 percent by weight, based on the total weight of resin solids in the thermosetting composition.

14. A liquid thermosetting composition comprising:

(a) a crosslinking agent having at least two functional groups that are reactive with epoxide groups; and (b) a non-gelled, epoxy functional block copolymer prepared by atom transfer radical polymerization, in the presence of an initiator having at least one radically transferable group, and wherein the polymer contains at least one of the following polymer chain structures:

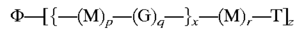

$$\Phi-[\{-(M)_p-(G)_q-\}_x-(M)_r-T]_z$$

or

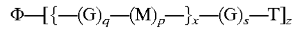

$$\Phi-[\{-(G)_q-(M)_p-\}_x-(G)_s-T]_z$$

wherein M is a residue, that is free of epoxy functionality, of at least one ethylenically unsaturated radically polymerizable monomer; G is a residue, that has epoxy functionality, of at least one ethylenically unsaturated radically polymerizable monomer; Φ is a residue from the initiator, free from the radically transferable group, selected from the group consisting of linear or branched aliphatic compounds, cycloaliphatic compounds, heterocyclic compounds, sulfonyl compounds, sulfenyl compounds, esters of carboxylic acids, polymeric compounds and mixtures thereof; T is or is derived from the radically transferable group and is selected from the group consisting of halide and a dehalogenation reaction product of a limited radically polymerizable ethylenically unsaturated compound; z represents the number of radically transferable groups; r, s, p and q represent average numbers of residues occurring in a block of residues in each polymer chain structure; z, r, s, p, q and x are each individually selected for each structure such that said epoxy functional block copolymer has a number average molecular weight of at least 250; p is an integer of from 1 to 100; q is an integer of from 1 to 15; and x is an integer of from 1 to 10; r is an integer from 3 to 100; s is an integer from 3 to 10; z is an integer from 2 to 10; and wherein the epoxy functional polymer has an epoxy equivalent weight of from 128 to 10,000 grams/equivalent.

15. The thermosetting composition of claim 14 wherein M is a polymerized monomer from at least one monomer selected from the group consisting of vinyl monomers, (meth)allylic monomers and olefins.

16. The thermosetting composition of claim 14 wherein M is a polymerized monomer from at least one monomer selected from the group consisting of alkyl (meth)acrylates having 1 to 20 carbon atoms in the alkyl group, unsaturated aromatic monomers and olefins.

17. The thermosetting composition of claim 14 wherein G is a polymerized monomer from at least one monomer selected from the group consisting of glycidyl acrylate, glycidyl methacrylate, 3,4-epoxycyclohexylmethyl(meth) acrylate, 2-(3,4-epoxycyclohexyl)ethyl(meth)acrylate and allyl glycidyl ether.

18. The thermosetting composition of claim 14 wherein the epoxy functional polymer has a number average molecular weight of from 500 to 16,000, and a polydispersity index of less than 1.8.

19. The thermosetting composition of claim 14 wherein T is a halide.

20. The thermosetting composition of claim 14 wherein said crosslinking agent is selected from the group consisting of polyamines, polyamide, polycarboxylic acid and polyphenolic compounds.

21. The thermosetting composition of claim 20 wherein said crosslinking agent is selected from the group cqnoizting of dodecanedioic acid, azelaic acid, adipic acid, 1,6-hexanedioic acid, succinic acid, pimelic acid, oebacic acid, maleic acid, citric acid, itaconic acid, aconitic acid, carboxylic acid-terminated polyesters, half-esters formed from reacting an acid anhydride with a polyol and mixtures thereof.

22. The thermosetting composition of claim 14 wherein said epoxy functional polymer is selected from the group consisting of linear polymers, branched polymers, hyperbranched polymers, star polymers, graft polymers and mixtures thereof.

23. The thermosetting composition of claim 14 wherein said epoxy functional polymer has a polydispersity index of less than 1.50.

24. The thermosetting composition of claim 14 wherein the equivalent ratio of epoxy groups in (b) to reactive functional groups in (a) is within the range of 1:0.5 to 1:1.5.

25. The thermosetting composition of claim 14 wherein (a) is present in amounts of 10 to 90 percent by weight and (b) is present in an amount of 10 to 90 percent by weight, based on the total weight of resin solids in the thermosetting composition.

* * * * *

UNITED STATES PATENT AND TRADEMARK OFFICE

CERTIFICATE OF CORRECTION

PATENT NO. : 6,319,967 B1
DATED : November 20, 2001
INVENTOR(S) : Coca et al.

It is certified that error appears in the above-identified patent and that said Letters Patent is hereby corrected as shown below:

Column 29,
Line 63, delete the word “derived” and at line 66, delete "2-2,4-epoxycyclohexyl)ethyl (meth)acrylate” and replace it with -- 2-(3,4-epoxycyclohexyl)ethyl(meth)acrylate --.

Column 32,
Line 1, delete the words “polyamide” and “acid” and replace them with -- polyamides -- and -- acids --.
Line 4, delete “cqnoizting” and insert -- consisting -- and line 6, delete “oebacic” and insert -- sebacic --.

Signed and Sealed this

Tenth Day of September, 2002

*Attest:*

JAMES E. ROGAN

*Attesting Officer* *Director of the United States Patent and Trademark Office*